United States Patent
Funahashi et al.

(10) Patent No.: US 10,006,814 B2
(45) Date of Patent: Jun. 26, 2018

(54) TEMPERATURE DETECTING DEVICE

(71) Applicants: Murata Manufacturing Co., Ltd., Nagaokakyo-shi, Kyoto-fu (JP); Daihatsu Diesel Mfg. Co., Ltd., Osaka-shi, Osaka (JP)

(72) Inventors: Shuichi Funahashi, Nagaokakyo (JP); Takanori Nakamura, Nagaokakyo (JP); Masaru Mochizuki, Osaka (JP); Noboru Abe, Osaka (JP); Junya Chujo, Osaka (JP)

(73) Assignees: MURATA MANUFACTURING CO., LTD., Nagaokakyo-Shi, Kyoto-Fu (JP); DAIHATSU DIESEL MFG. CO., LTD., Osaka-Shi, Osaka (JP)

( * ) Notice: Subject to any disclaimer, the term of this patent is extended or adjusted under 35 U.S.C. 154(b) by 387 days.

(21) Appl. No.: 14/967,936

(22) Filed: Dec. 14, 2015

(65) Prior Publication Data
US 2016/0097684 A1 Apr. 7, 2016

Related U.S. Application Data

(63) Continuation of application No. PCT/JP2014/066819, filed on Jun. 25, 2014.

(30) Foreign Application Priority Data

Jul. 1, 2013 (JP) .................................. 2013-138273

(51) Int. Cl.
*G01K 7/00* (2006.01)
*G01K 7/06* (2006.01)
(Continued)

(52) U.S. Cl.
CPC ............... *G01K 7/02* (2013.01); *G01K 13/02* (2013.01); *G01K 2013/024* (2013.01); *G01K 2205/04* (2013.01)

(58) Field of Classification Search
CPC ............ G01K 7/00; G01K 7/06; G01K 13/00; G01K 17/00; H01L 35/00
See application file for complete search history.

(56) References Cited

U.S. PATENT DOCUMENTS 5,610,366 A * 3/1997 Fleurial .................. H01L 35/18
136/202
8,827,553 B2 9/2014 Kaul et al.
(Continued)

FOREIGN PATENT DOCUMENTS

CN 102088260 A 6/2011
DE 102009060893 A1 * 7/2011 ............... G01K 1/16
(Continued)

OTHER PUBLICATIONS

PCT/JP2014/066819 International Search Report dated Sep. 22, 2014.
PCT/JP2014/066819 Written Opinion dated Sep. 22, 2014.

*Primary Examiner* — Gail Kaplan Verbitsky
(74) *Attorney, Agent, or Firm* — Arent Fox LLP (57) ABSTRACT

A temperature detecting device (101) includes: a detecting unit (11) which detects a temperature of a heat source (1); a power generation unit (12) which includes a thermoelectric conversion element (3) and is spaced from the detecting unit (11); a first heat transfer unit (41) that transfers heat or cold of the heat source (1) to the power generation unit (12); a radiator (13) which is remote from the power generation unit (12) so as to radiate heat or cold to outside; a second heat transfer unit (42) that receives heat or cold from the power generation unit (12) and that transfers the heat or cold to the radiating unit (13); and an output unit (14) that outputs a result of the measurement made by the temperature receiving element (2). The thermoelectric conversion element (3) generates electric power by way of a temperature difference between a surface (3*a*) and a surface (3*b*) and supplies
(Continued)

electric power to the temperature receiving element (2) and the output unit (14).

14 Claims, 6 Drawing Sheets

(51) Int. Cl.
 *H01L 35/00* (2006.01)
 *G01K 7/02* (2006.01)
 *G01K 13/02* (2006.01)

(56) References Cited

U.S. PATENT DOCUMENTS

| | | | |
|---|---|---|---|
| 2009/0059995 A1* | 3/2009 | Burian | G01N 25/08 374/27 |
| 2010/0091816 A1* | 4/2010 | Schroll | G01K 7/04 374/165 |
| 2011/0162736 A1 | 7/2011 | Kaul et al. | |
| 2011/0247668 A1* | 10/2011 | Bell | F02G 1/043 136/200 |
| 2012/0281804 A1* | 11/2012 | Lu | G21D 1/00 376/320 |
| 2013/0082839 A1* | 4/2013 | Farley | G08B 17/06 340/539.27 |
| 2014/0338713 A1* | 11/2014 | Nakanuma | H01L 35/30 136/204 |
| 2014/0352749 A1* | 12/2014 | Strei | F28D 15/0275 136/201 |
| 2015/0047685 A1* | 2/2015 | Stenner | H01L 35/32 136/203 |
| 2017/0301847 A1* | 10/2017 | Kirihara | H01L 37/00 |

FOREIGN PATENT DOCUMENTS

| | | | |
|---|---|---|---|
| JP | 11-220804 A | | 8/1999 |
| JP | 2004157052 A | | 6/2004 |
| JP | 2008-241648 A | | 10/2008 |
| JP | 2008-261747 A | | 10/2008 |
| JP | 02011239638 A | * | 11/2011 |
| JP | 2012112710 A | | 6/2012 |
| JP | 2013-45929 A | | 3/2013 |
| KR | 20130017239 A | * | 2/2013 |

\* cited by examiner

FIG.7

TEMPERATURE DETECTING DEVICE

CROSS REFERENCE TO RELATED APPLICATIONS

This is a Continuation of PCT Application No. PCT/JP2014/066819 filed Jun. 25, 2014 which claims priority to Japanese National Application No. 2013-138273 filed Jul. 1, 2013.

BACKGROUND OF THE INVENTION

The present invention relates to a temperature detecting device. Such devices are sometimes used in a monitoring system for detecting abnormal events at an early stage by detecting a temperature of a fluid such as exhaust gas emitted from a device such as an engine. Such monitoring systems are effective in preventing failure of the device or accidents.

Japanese Patent Laying-Open No. 2004-157052 (Patent Document 1) describes an exemplary temperature sensor for detecting a temperature of a target fluid, wherein an element is provided in a distribution path in which the target fluid is distributed under a high temperature environment such as inside of a catalytic converter of an exhaust gas purifying device or inside of an exhaust pipe. Japanese Patent Laying-Open No. 2012-112710 (Patent Document 2) describes an exemplary temperature monitoring device.

In order to construct a system for monitoring the temperature of a fluid, temperature sensors are provided at a multiplicity of locations to form a sensor network. In the system disclosed in Patent Document I, temperature sensors which transmit the sensed temperatures to an external device do so using external wires. This limits the locations at which the sensors can be used and increases the costs of installation.

One possible solution to this problem is to use wireless temperature sensors. However, wireless temperature sensors needs a battery, resulting in a problem of replacement cost of the battery.

The device described in Patent Document 2, a thermoelectric conversion element is used to generate electric power based on heat energy received from a monitoring target, temperature information is generated based on a voltage signal output from the thermoelectric conversion element, and the temperature information is transmitted to outside through an antenna. However, Patent Document 2 provides no detailed description regarding application, method of contact to a heat source, a cooling method, and the like, and a specific structure thereof is unknown.

The present invention has an object to provide a temperature detecting device that preferably does not require wiring and battery exchange in order to secure power supply, that detects a temperature of a heat source, and that can operate continuously.

Solution to Problem

In order to achieve the above-described object, a temperature detecting device according to the present invention includes: a temperature detector that detects a temperature of a heat source; a power generation unit including a thermoelectric conversion element, the power generating unit being spaced from the detecting unit; a first heat transfer unit that transfers heat or cold of the heat source to the power generation unit; a radiator spaced from the power generation unit for radiating heat or cold; a location outside of the temperature detecting device; a second heat transfer unit that receives heat or cold from the power generation unit and that transfers the heat or cold to the radiator; and an output unit coupled to the temperature detector and transmitting or providing information about the temperature detected by the temperature detector, the thermoelectric conversion element generating electric power by way of a temperature difference between a surface of the thermoelectric conversion element facing the first heat transfer unit and a surface of the thermoelectric conversion element facing the second heat transfer unit, the thermoelectric conversion element supplying electric power required to operate the temperature receiving element and the output unit.

According to the present invention, the temperature detecting device itself generates electric power by way of the temperature difference in the thermoelectric conversion element to provide electric power for operating the temperature detector and the output unit. Hence, there can be provided a temperature detecting device that does not require wiring and battery exchange for securing power supply, that detects a temperature of a heat source, and that can operate continuously.

DESCRIPTION OF EMBODIMENTS

Hereinafter, it is assumed that the concept "heat source" is not limited to a heat source having a temperature higher than the ambient temperature but includes a cold source having a temperature lower than the ambient temperature. Moreover, the "heat source" includes not only a source staying at one location but also a continuously flowing fluid.

First Embodiment

Figure 1:
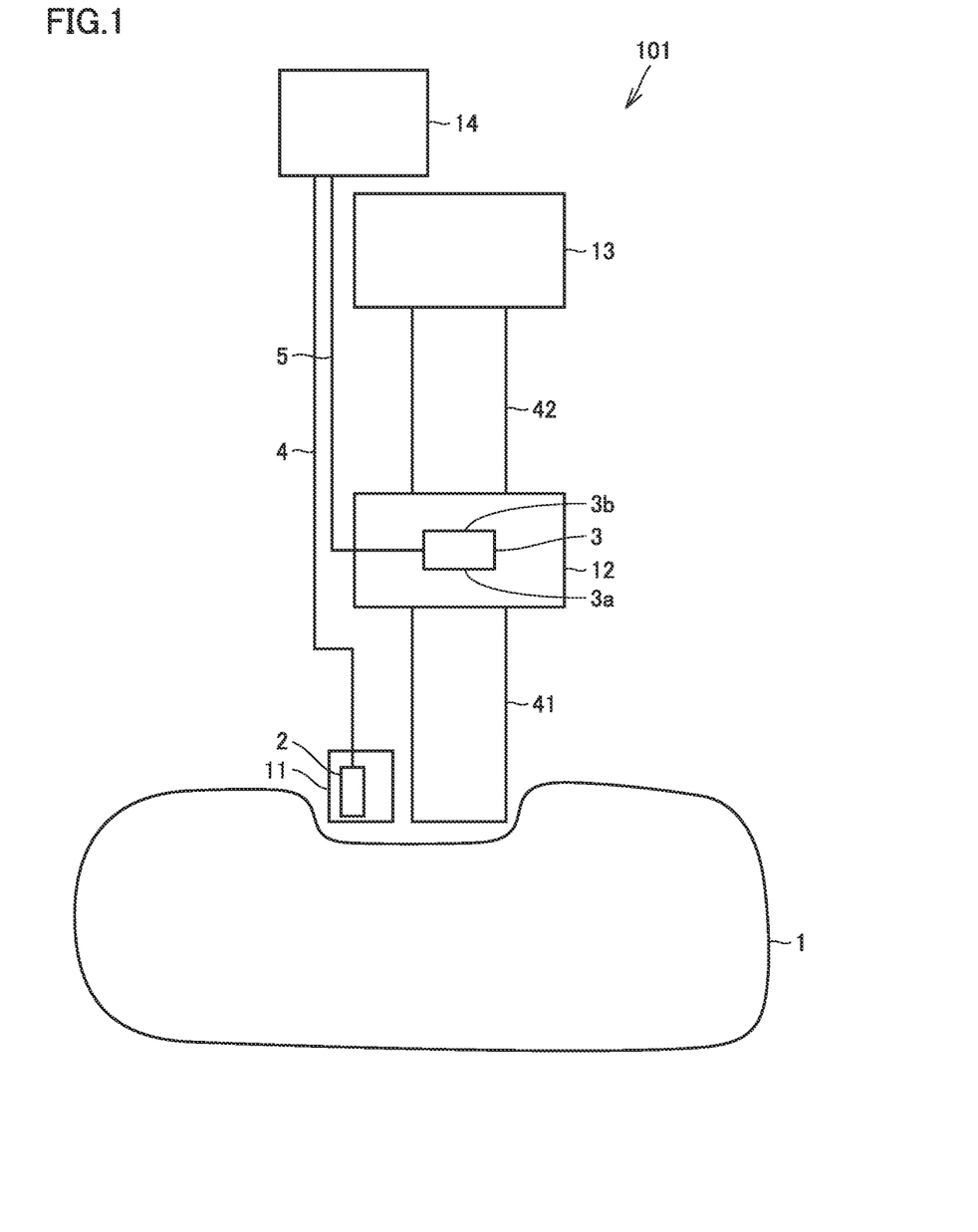
FIG. 1 is a conceptual view of a temperature detecting device in a first embodiment according to the present invention.
Figure 2:
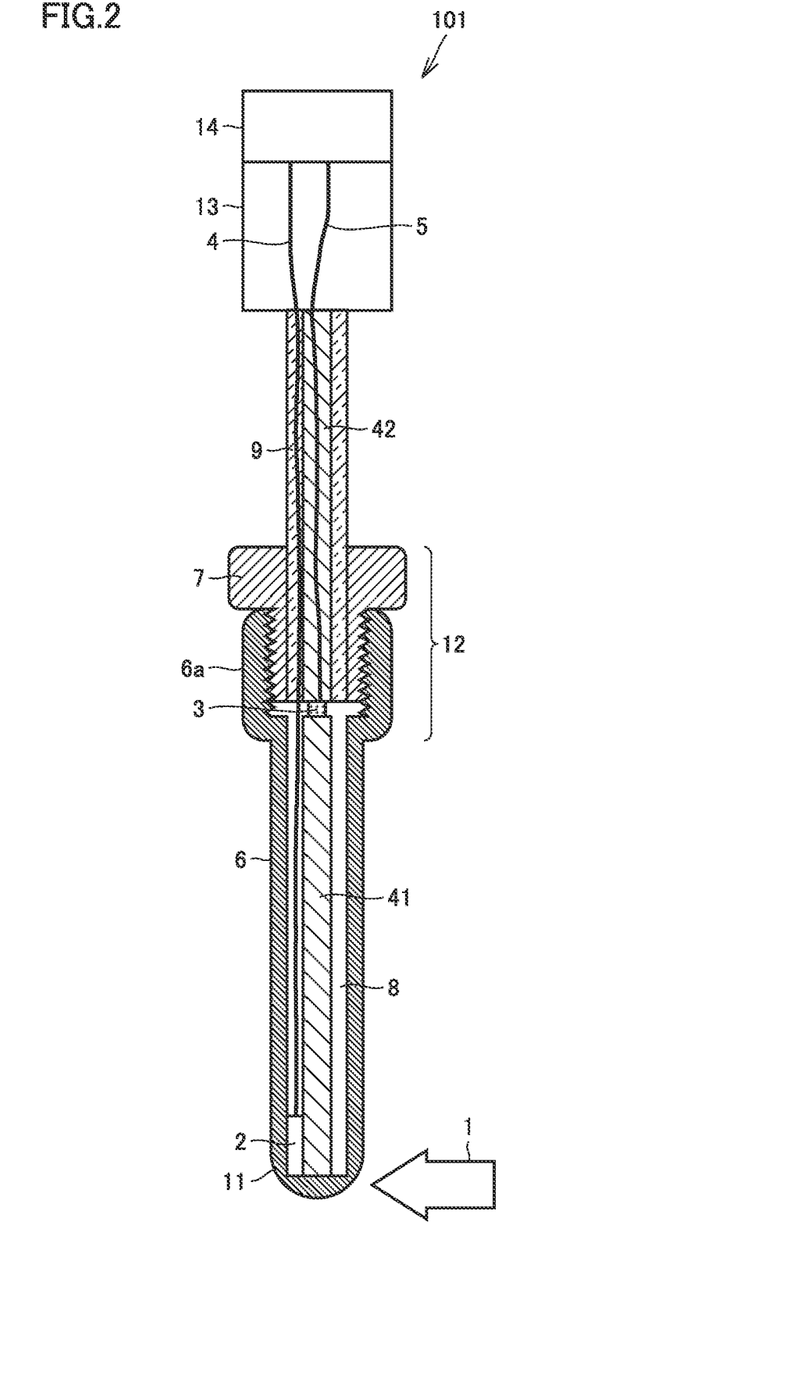
FIG. 2 is a cross sectional view of the temperature detecting device in the first embodiment according to the present invention.
Figure 3:
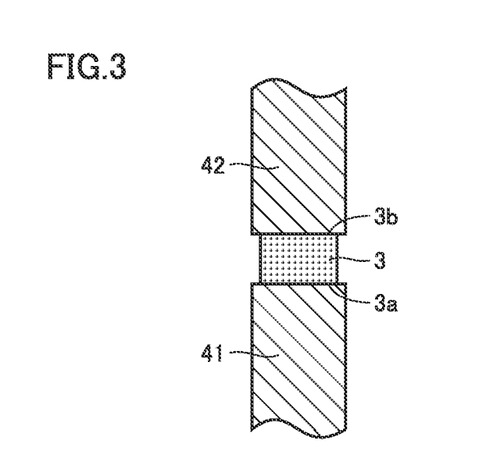
FIG. 3 is a partial enlarged cross sectional view of the temperature detecting device in the first embodiment according to the present invention.

With reference to FIG. 1 to FIG. 3, the following describes a temperature detecting device in a first embodiment according to the present invention. A temperature detecting device 101 in the present embodiment is conceptually shown in FIG. 1.

Temperature detecting device 101 in the present embodiment includes: a detecting unit 11 including a temperature receiving element 2 that detects a temperature of a heat source 1; a power generation unit 12 which is spaced from detecting unit 11 and including a thermoelectric conversion element 3; a first heat transfer unit 41 that transfers heat or cold of heat source 1 to power generation unit 12; a radiating unit or radiator 13 which is spaced from power generation unit 12 for radiating heat or cold to a location external to the temperature detecting device; a second heat transfer unit 42 that receives heat or cold from power generation unit 12 and transfers the heat or cold to radiating unit 13; and an output unit 14 that outputs information about the temperature detected by the temperature receiving element. Thermoelectric conversion element 3 generates electric power by way of a temperature difference between a surface 3a of thermoelectric conversion element 3 facing first heat transfer unit 41 and a surface 3b of thermoelectric conversion element 3 facing second heat transfer unit 42. Thermoelectric conversion element 3 supplies electric power required to operate temperature receiving element 2 and output unit 14.

The temperature receiving element 2 and the output unit 14 are connected to each other by a wire 4. Thermoelectric conversion element 3 and the output unit 14 are connected to each other by a wire 5. Output unit 14 will typically be provided with an electronic circuit. As a method of outputting by output unit 14, a method of wirelessly transmitting is considered as described below in a second embodiment; however, a method of displaying using a certain display device is also considered.

In FIG. 1, the tip of first heat transfer unit 41 is illustrated at a location different from that of detecting unit 11; however, both temperature receiving element 2 and the tip of first heat transfer unit 41 may be located within detecting unit 11.

FIG. 2 shows a more specific configuration of temperature detecting device 101. For ease of description, in FIG. 2, some components, such as a case 6, are illustrated as being cross-sectioned in half. The concepts "upper" and "lower" as mentioned herein are for ease of description, and the device is not necessarily used in such a posture during actual use.

In the example shown in FIG. 2, first heat transfer unit 41 is stored in cylindrical case 6 which has a closed lower end having a dome-like outer shape. Temperature receiving element 2 is provided in case 6. The lower end of case 6 stores temperature receiving element 2, and serves as detecting unit 11. Temperature receiving element 2 is in contact with the inner surface of case 6. The tip of first heat transfer unit 41 is also in contact with the inner surface of case 6. In the example shown in FIG. 2, both the tip of first heat transfer unit 41 and the temperature receiving element 2 are provided in detecting unit 11.

The upper end of case 6 is open and services as a power generation unit housing 6a having a shape adapted to store thermoelectric conversion element 3 therein. Thermoelectric conversion element 3 is fixed in power generation unit housing 6a by attaching a fixing component 7 from above. In the example shown in FIG. 2, the inner surface of power generation unit housing 6a is provided with an internal thread, and the lower outer surface of fixing component 7 is provided with an external thread. Fixing component 7 is threaded into power generation unit housing 6a to press thermoelectric conversion element 3 down and hold it in place. FIG. 3 shows an enlarged view of the vicinity of thermoelectric conversion element 3. Thermoelectric conversion element 3 has opposing surfaces 3a and 3b. Surface 3a of thermoelectric conversion element 3 is in contact with the end of first heat transfer unit 41, whereas surface 3b is in contact with the end of second heat transfer unit 42.

The thermoelectric conversion element generates electric power when a temperature difference is formed between both the surfaces thereof by heating one surface and cooling the other surface. As this temperature difference increases, the amount of electric power generated increases.

In temperature detecting device 101 according to the present embodiment, first heat transfer unit 41 transfers thermal energy of heat source 1 to power generation unit 12, and thermal energy of power generation unit 12 is transferred to a radiating unit 13 by second heat transfer unit 42. Accordingly, a temperature difference is caused between surface 3a of thermoelectric conversion element 3 facing first heat transfer unit 41 and surface 3b of thermoelectric conversion element 3 facing second heat transfer unit 42 in power generation unit 12, whereby thermoelectric conversion element 3 can generate electric power by way of this temperature difference. The generated electric power is supplied to output unit 14 via wire 5. This electric power can provide electric power required to operate temperature receiving element 2 and output unit 14. Temperature receiving element 2 is connected to output unit 14 via wire 4.

Figure 4:
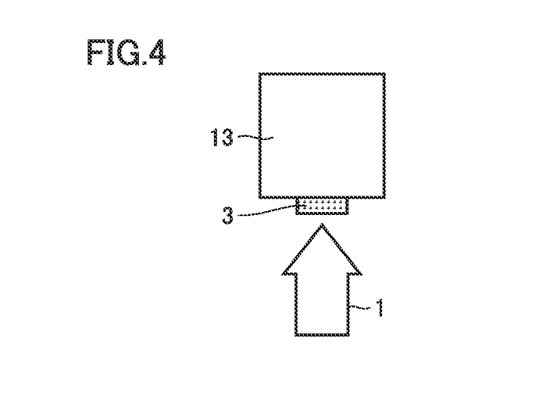
FIG. 4 is a conceptual view of an exemplary simple power generation module.

In the present embodiment, power generation unit 12 is located at a position remote from detecting unit 11 so that the temperature difference between surfaces 3a, 3b of thermoelectric conversion element 3 is unlikely to be adversely affected by the heat from heat source 1, thus efficiently attaining a large temperature difference. Therefore, electric power can be generated efficiently. For example, as a simple example, the following configuration can be considered: thermoelectric conversion element 3 is provided such that one surface thereof is in contact with heat source 1 and the other surface is in contact with radiating unit 13 as shown in FIG. 4. However, with such a configuration, the whole temperature is increased due to the heat from heat source 1, with the result that the temperature difference is unlikely to be large between the two surfaces of thermoelectric conversion element 3. However, in the present embodiment, power generation unit 12 is provided to be spaced from detecting unit 11 as shown in FIG. 2, thereby forming a large temperature difference efficiently.

The temperature detecting device of the present embodiment can internally generate electric power and provide electric power for operating temperature receiving element 2 and output unit 14, thereby attaining a substantially maintenance-free, wireless temperature detecting device that can operate semipermanently without using a primary battery. That is, the temperature detecting device in the present embodiment does not require external wiring and battery exchange to secure power supply, can detect the temperature of the heat source, and can operate continuously. It should be noted that first heat transfer unit 41 is preferably a heat pipe or a metal rod. By employing this configuration, first heat transfer unit 41 can efficiently transfer heat or cold to thermoelectric conversion element 3.

The outer circumferential surface of first heat transfer unit 41 is preferably surrounded by a heat insulator which can be a heat insulating material, an evacuated space or a space filled with a heat insulating gas. In the example shown in FIG. 2, the outer circumferential surface of first heat transfer unit 41 is surrounded by a cylindrical space 8 defined by the outer surface of the first heat transfer unit 41 and the inner surface of case 6. Space 8 may be a vacuum or filled with air or other suitable insulating gas. Alternatively, the space may be filled with a heat insulating material.

For example, when heat source 1 has a high temperature, heat (thermal energy) coming from heat source 1 to the lower end of first heat transfer unit 41 is transferred via first heat transfer unit 41, thermoelectric conversion element 3, second heat transfer unit 42, and radiating unit 13 in this order. In order to achieve a temperature difference in thermoelectric conversion element 3 which is as large as possible, the heat originating from heat source 1 and transferring to the lower end of first heat transfer unit 41 is desirably transferred to surface 3a of thermoelectric conversion element 3 with as low a loss as possible. By surrounding the outer circumferential surface of first heat transfer unit 41 with a heat insulator or space, the heat arriving at the lower end of first heat transfer unit 41 can be prevented from being lost during the transfer to the thermoelectric conversion unit.

When a high-temperature fluid to be measured flows in a pipe, the temperature is high at the central portion of the pipe, but the temperature tends to be slightly lower in the vicinity of the outer circumference of the pipe. When the tip of first heat transfer unit 41 and detecting unit 11 are disposed to reach the central portion of the pipe, the presence of a heat insulator or space surrounding the first heat transfer unit 41 prevents the heat received by first heat transfer unit 41 at the central portion of the pipe from being removed by the fluid in the vicinity of the outer circumference of the pipe during transfer in first heat transfer unit 41.

Also, it is also preferable to suppress other heat from being externally introduced into an undesirable portion of the temperature detecting device as much as possible. This is because the temperature difference in thermoelectric conversion element 3 becomes small when the portion that does not need to have a high temperature has a high temperature due to the externally provided heat. By surrounding the outer circumferential surface of first heat transfer unit 41 with a heat insulator, the amount of such externally introduced heat reaching the first heat transfer unit 41 can be reduced.

The present embodiment provides an example in which case 6 is provided to store at least first heat transfer unit 41 therein. Case 6 serves to prevent the deterioration of first heat transfer unit 41 due to first heat transfer unit 41 being directly subjected to a high-temperature fluid to be measured. As an alternative embodiment, the temperature detecting device may be configured without case 6. Even when no case 6 is provided to store first heat transfer unit 41 therein, temperature receiving element 2 and first heat transfer unit 41 are provided. In this case, first heat transfer unit 41 preferably has an exposed tip and has an outer circumferential surface surrounded by a heat insulator.

In the present embodiment, second heat transfer unit 42 is preferably a heat pipe or a metal rod. By employing this configuration, second heat transfer unit 42 can transfer heat or cold efficiently to radiating unit 13.

The outer circumferential surface of second heat transfer unit 42 is preferably surrounded by a heat insulating material or a space which is either a vacuum or is filled with a heat insulating gas. In the example shown in FIG. 2, the outer circumferential surface of second heat transfer unit 42 is surrounded by heat insulator 9 made of a heat insulating material. Instead of using heat insulator 9, the outer circumferential surface of second heat transfer unit 42 may be surrounded by a space (again acting as a heat insulator) by providing a case surrounding second heat transfer unit 42. This space may be a vacuum filled with a heat insulating material or gas. With such a configuration, heat which would otherwise be peripherally transferred from first heat transfer unit 41 or the like (not via thermoelectric conversion element 3) can be prevented from being introduced into second heat transfer unit 42, thereby avoiding an undesired decrease in temperature difference in thermoelectric conversion element 3. Moreover, with this configuration, heat radiated by external environment can be also prevented from being introduced into second heat transfer unit 42.

Output unit 14 is preferably located remotely from radiating unit 13 when viewed from heat source 1. By employing this configuration, output unit 14 can be less affected by the heat from heat source 1. Output unit 14 normally includes an electronic circuit which transmits information about the temperature measurements made by the temperature sensor to an external device. Generally, an electronic circuit is sensitive to heat and problems may arise in the heat if too much heat is allowed to reach output unit 14. Moreover, components employed for purposes other than the operation of outputting a result of measurement obtained from temperature receiving element 2 may be provided as required, and are preferably located remotely from radiating unit 13 when viewed from heat source 1. Examples of such components include power supply management components, communication components, power storage components, and the like. By suppressing the influence of the heat over these components, electric energy loss resulting from temperature increase can be suppressed.

It should be noted that power generation unit 12 may be used to fix temperature detecting device 101 to, for example, a pipe in which the fluid to be measured flows. In this case, temperature detecting device 101 is attached to extend through the outer wall of the pipe. Namely, temperature detecting device 101 is attached to the pipe such that the portion below power generation unit 12 in FIG. 2 extends into the pipe and the portion above power generation unit 12 in FIG. 2 projects out from the pipe. As a result, detecting unit 11 is disposed at a location deep in the pipe to some extent, and radiating unit 13 is disposed at a location outside the pipe to be separated therefrom to some extent.

Second Embodiment

Figure 5:
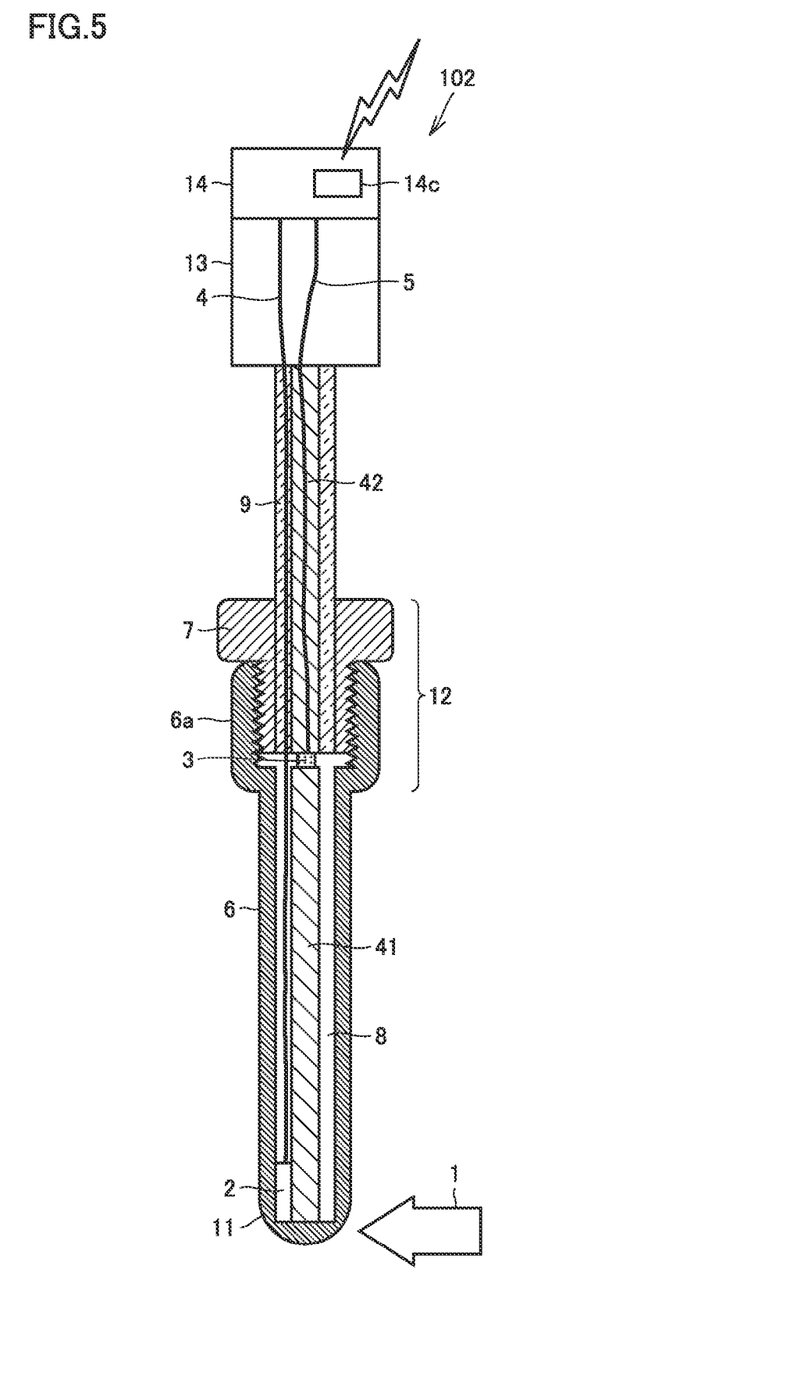
FIG. 5 is a cross sectional view of a temperature detecting device in a second embodiment according to the present invention.

With reference to FIG. 5, the following describes a temperature detecting device 102 in a second embodiment according to the present invention.

The primary difference and temperature detecting device 102 of between the present embodiment and temperature detecting device 101 of the first embodiment is the fact that the output unit 14 of temperature detecting device 102 includes a wireless signal transmitter 14c that wirelessly transmits an output signal. Since wireless signal transmitting device 14c is a portion of output unit 14, electric power for operating wireless signal transmitting device 14c is also supplied by thermoelectric conversion element 3 as part of electric power for operating output unit 14.

In the present embodiment, since output unit 14 includes wireless signal transmitting device 14c, the temperature measurement obtained from the temperature receiving element can be delivered to a remote location without a wired connection. The temperature detecting device in the present embodiment can itself generate electric power by way of the temperature difference, requires no wire for electric power supply from outside the temperature detecting device, and transmits the result of the measurement as a wireless signal. Accordingly, the temperature detecting device can be semi-permanently used in a completely wireless manner, thereby completely eliminating the restrictions of wiring. This facilitates providing a sufficiently large number of temperature detecting devices at desired locations for a monitoring target, thus contributing to constructing a sensor network for monitoring of the monitoring target.

Third Embodiment

Figure 6:
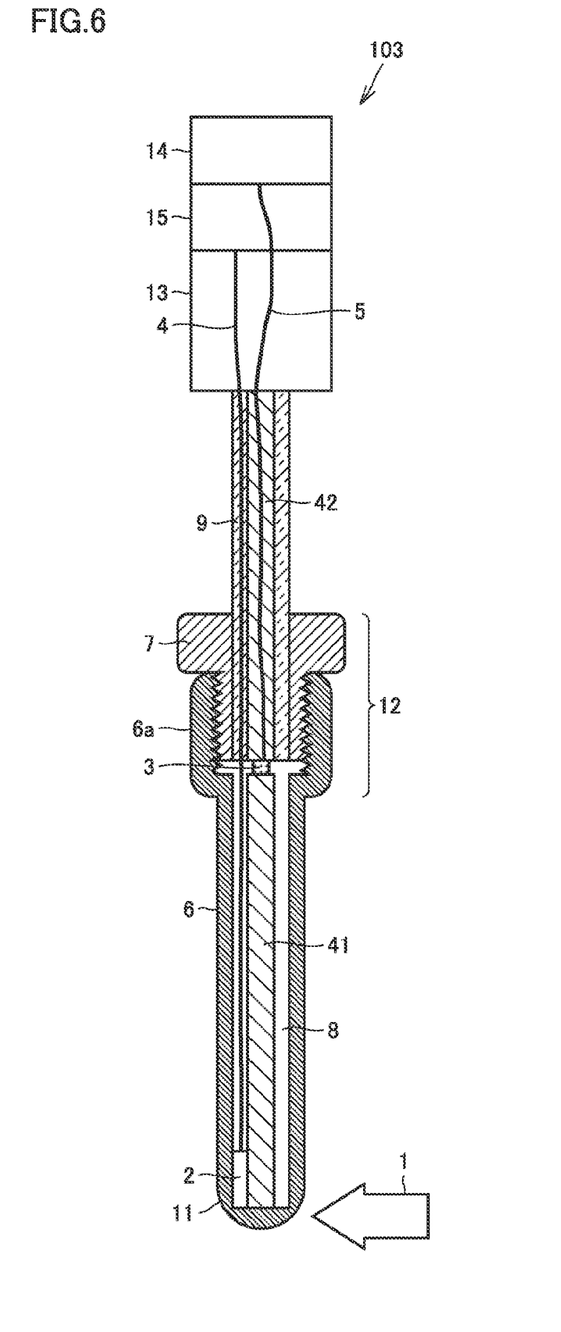
FIG. 6 is a cross sectional view of a temperature detecting device in a third embodiment according to the present invention.

With reference to FIG. 6, the following describes a temperature detecting device 103 in a third embodiment according to the present invention.

The temperature detecting device 103 of the present embodiment has basically the same configuration as the temperature detecting device 101 of the first embodiment, but adds a fan 15 for facilitating radiation of heat or cold in radiating unit 13. Electric power required to operate fan 15 is supplied by thermoelectric conversion element 3.

The fan 15 adds to the radiation of heat or cold in radiating unit 13. If heat or cold was not sufficiently radiated in radiating unit 13, the functioning of the output unit 14 may be adversely affected. However, the radiation is facilitated by fan 15, thereby avoiding the adverse effect over output unit 14. When output unit 14 includes an electronic circuit and radiating unit 13 radiates heat, it is important to radiate the heat efficiently by fan 15 because an electronic circuit is sensitive to heat. In the example shown in FIG. 6, radiating unit 13, fan 15, and output unit 14 are arranged in this order; however, this is just an example and these units are not necessarily arranged in this manner.

It should be noted that the temperature detecting device according to the present invention may be used generally for a high-temperature fluid. In this case, it is considered that the heat is transferred from heat source 1 to first heat transfer unit 41, electric power is generated by forming a temperature difference in thermoelectric conversion element 3 with the lower surface being the high-temperature side and the upper surface being the low-temperature side in FIG. 2, then the heat transferred from first heat transfer unit 41 to second heat transfer unit 42 via thermoelectric conversion element 3 is further transferred to radiating unit 13, and the heat is radiated in radiating unit 13. However, the temperature detecting device according to the present invention can be used also for a low-temperature fluid. That is, the temperature detecting device according to the present invention may be configured such that: heat source 1 is a relatively cold source having a temperature lower than the normal temperature and thermoelectric conversion element 3 generates electric power using a temperature difference formed between the surface of thermoelectric conversion element 3 facing first heat transfer unit 41 and the surface of thermoelectric conversion element 3 facing second heat transfer unit 42 by radiating the cold in radiating unit 13. Radiating the cold in radiating unit 13 means that radiating unit 13 receives heat from outside. In this case, a temperature difference is formed with the lower surface of thermoelectric conversion element 3 being the low-temperature side and the upper surface thereof being the high-temperature side in FIG. 2. The temperature detecting device according to the present invention may have such a configuration.

Example 1

As samples, a plurality of temperature detecting devices 101 shown in FIG. 2 were produced and an experiment was performed to derive a temperature difference by way of an amount of generated electric power by heating a lower portion thereof. As thermoelectric conversion element 3, a lamination type thermoelectric conversion element produced using an oxide material was used. Thermoelectric conversion element 3 had a size of 7 mm×6 mm×3 mm, and could be used up to 400° C. Thermoelectric conversion element 3 used here had sufficiently strong mechanical strength. As radiating unit 13, a heat sink was used which was made of aluminum and had a size of 50 mm×50 mm×20 mm. Each of first heat transfer unit 41 between heat source 1 and thermoelectric conversion element 3 and second heat transfer unit 42 between thermoelectric conversion element 3 and radiating unit 13 had a diameter of 8 mm, and different first heat transfer units 41 and second heat transfer units 42 were used for the respective samples. For each of sample numbers 1 to 9, as shown in Table 1, a copper rod, an aluminum rod, or a copper-water type heat pipe was used. The lower portion of cylindrical case 6 was heated to a setting temperature, and the amount of generated electric power was measured. Based on the measured amount of generated electric power, the temperature difference considered to be formed between the surfaces of thermoelectric conversion element 3 was calculated and derived in consideration of output characteristics of thermoelectric conversion element 3.

TABLE 1

| Sample Number | Setting Temperature [° C.] | Second Heat Transfer Unit between Thermoelectric Conversion Element and Radiating Unit | Length [mm] | First Heat Transfer Unit between Heat Source and Thermoelectric Conversion Element | Length [mm] | Temperature Difference [° C.] |
|---|---|---|---|---|---|---|
| 1 | 60 | Aluminum Rod | 150 | Aluminum Rod | 150 | 6.5 |
| 2 | 60 | Copper Rod | 150 | Copper Rod | 150 | 15.0 |
| 3 | 60 | Aluminum Rod | 150 | Copper-Water Heat Pipe | 150 | 12.7 |
| 4 | 60 | Copper Rod | 150 | Copper-Water Heat Pipe | 150 | 16.9 |
| 5 | 60 | Copper-Water Heat Pipe | 150 | Copper-Water Heat Pipe | 150 | 17.0 |
| 6 | 60 | Copper-Water Heat Pipe | 150 | Copper-Water Heat Pipe | 100 | 16.9 |
| 7 | 60 | Copper-Water Heat Pipe | 150 | Copper Rod | 100 | 16.0 |
| 8 | 96 | Copper-Water Heat Pipe | 150 | Copper Rod | 100 | 36.7 |
| 9 | 139 | Copper-Water Heat Pipe | 150 | Copper Rod | 100 | 59.0 |

The derived temperature difference is shown in Table 1. From the experimental result of each of samples 1 to 9, it can be said that when a copper rod or a copper-water heat pipe is used, the temperature difference in thermoelectric conversion element 3 tends to be larger than that in the case where an aluminum rod is used for each heat transfer unit.

Example 2

Temperature detecting device 102 described in the second embodiment was installed at a pipe for exhaust gas of a diesel engine to generate electric power, and the electric power was used to measure temperature and wirelessly transmit the result of the measurement. A copper-water type heat pipe having a diameter of 8 mm was used as second heat transfer unit 42 between thermoelectric conversion element 3 and radiating unit 13, and a copper rod having a diameter of 8 mm was used as first heat transfer unit 41 between heat source 1 and thermoelectric conversion element 3. Moreover, a power supply circuit including a DC-DC converter (LTC3108 provided by Linear Technology) was used as a voltage management circuit, whereas a Pt1000 temperature sensor (provided by RS) was used as temperature receiving element 2. Further, a 315-MHz communication module (provided by EnOcean) was used as wireless signal transmitting device 14*c*. An aluminum electrolytic capacitor of 0.5 mF was used for a power storage unit.

When this experiment was performed, the exhaust gas had a temperature of about 290° C. The temperature of each region of temperature detecting device 102 is shown in Table 2.

TABLE 2

| Region | Temperature [° C.] |
|---|---|
| Circuit Unit | 50 |
| Radiating Unit | 70 |
| Surface of Thermoelectric Conversion Element facing Heat Source | 138 |
| Detecting Unit | 230 |

When calculated from the amount of generated electric power, the temperature difference considered to be formed in thermoelectric conversion element 3 was 46° C.

As a result of this experiment, it was confirmed that a signal indicating a measured temperature was wirelessly transmitted at an interval of one second. Since electric power for this transmission was not supplied from outside, it can be said that the wireless transmission was performed using the electric power generated by way of the temperature difference in thermoelectric conversion element 3. The signals wirelessly transmitted could be received with satisfactory strengths at any location in the chamber of 25 m×25 m in which the diesel engine was installed.

Comparative Example

As a comparative example, a power generation module having the structure shown in FIG. 4 was produced. The same thermoelectric conversion element 3 and radiating unit 13 as those illustrated in experiment examples 1 and 2 were used.

This power generation module was installed at the surface of the pipe in which exhaust gas passed as with experiment example 2. The temperature of each region of this power generation module is shown in Table 3.

TABLE 3

| Region | Temperature [° C.] |
|---|---|
| Radiating Unit | 100 |
| Detecting Unit | 130 |

The power generation module shown in FIG. 4 does not include a portion clearly distinguishable as detecting unit 11, but the "detecting unit" as used in Table 3 is intended to indicate the vicinity of the lower surface of thermoelectric conversion element 3.

When calculated from the amount of generated electric power, the temperature difference considered to be formed in thermoelectric conversion element 3 was 11° C.

Example 3

Figure 7:
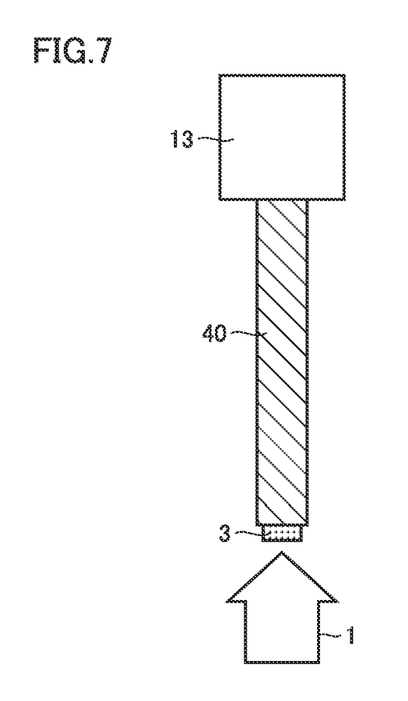
FIG. 7 is a conceptual view of a power generation module produced in Example 3.

A plurality of power generation modules each having a structure shown in FIG. 7 were produced and an experiment was conducted to derive the temperature difference by way of the amount of generated electric power by heating the lower portion thereof. The radiating unit and the temperature difference in the thermoelectric conversion element were inspected. The following two types of thermoelectric conversion elements were used: a lamination type high-temperature thermoelectric conversion element having a thermal conductivity of 10 W/mK; and a π type thermoelectric conversion element having a thermal conductivity of 1 W/mK. Each of the thermoelectric conversion elements had a size of 7 mm×6 mm×3 mm and one thermoelectric conversion element was used for one sample. As the radiating unit, a heat sink was used which was made of aluminum and had a size of 50 mm×50 mm×25 mm. As heat transfer unit 40 between thermoelectric conversion element 3 and radiating unit 13, a copper rod having a diameter of 10 mm or a copper-water type heat pipe was used. A plurality of samples were produced by providing different lengths of second heat transfer units 42. Radiating unit 13 was cooled by natural air cooling at a room temperature. It should be noted that the room temperature was 25° C.

As described above, for Example 3, there are the two types of thermoelectric conversion elements and the two types of second heat transfer units, so that the experimental results will be described individually below.

Example 3-1

First, in the sample employing the thermoelectric conversion element having a thermal conductivity of 10 W/mK and employing the copper rod as heat transfer unit 40, Table 4 shows results of measuring temperatures of radiating unit 13 caused due to respective combinations of setting conditions for heat source temperature and conditions for the length of heat transfer unit 40.

TABLE 4

| | Temperature [° C.] of Radiating Unit | | | | | |
|---|---|---|---|---|---|---|
| | Length [mm] of Second Heat Transfer Unit | | | | | |
| | 0 | 20 | 50 | 100 | 150 | 300 |
| Heat Source Temperature [° C.] | 40 | 38 | 36 | 34 | 32 | 30 | 28 |
| | 50 | 46 | 44 | 39 | 35 | 32 | 30 |
| | 60 | 54 | 50 | 45 | 38 | 35 | 31 |
| | 100 | 87 | 79 | 66 | 52 | 43 | 37 |
| | 150 | 128 | 113 | 92 | 68 | 54 | 44 |
| | 200 | 168 | 148 | 118 | 85 | 65 | 50 |
| | 300 | 249 | 216 | 168 | 116 | 84 | 62 |

Based on the results of measurement of the temperatures of radiating unit 13 shown in Table 4, the temperature difference considered to be formed between the surfaces of thermoelectric conversion element 3 was calculated and derived in consideration of output characteristics of thermoelectric conversion element 3. The results are shown in Table 5.

TABLE 5

Temperature Difference [° C.] Considered to be Formed in Thermoelectric Conversion Element

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 2 | 3 | 5 | 6 | 6 | 5 |
| | 50 | 4 | 6 | 9 | 10 | 10 | 8 |
| | 60 | 6 | 9 | 12 | 14 | 14 | 11 |
| | 100 | 13 | 20 | 28 | 32 | 32 | 25 |
| | 150 | 22 | 34 | 47 | 54 | 54 | 41 |
| | 200 | 32 | 48 | 66 | 76 | 76 | 59 |
| | 300 | 51 | 77 | 106 | 122 | 122 | 93 |

Example 3-2

Next, in the sample employing the thermoelectric conversion element having a thermal conductivity of 10 W/mK and employing the heat pipe as heat transfer unit 40, Table 6 shows results of measuring temperatures of radiating unit 13 caused due to respective combinations of setting conditions for heat source temperature and conditions for the length of heat transfer unit 40.

TABLE 6

Temperature [° C.] of Radiating Unit

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 38 | | | 32 | 30 | 29 |
| | 50 | 46 | | | 35 | 33 | 31 |
| | 60 | 54 | | | 39 | 36 | 33 |
| | 100 | 87 | | | 54 | 46 | 40 |
| | 150 | 128 | | | 71 | 58 | 50 |
| | 200 | 168 | | | 88 | 70 | 58 |
| | 300 | 249 | | | 121 | 92 | 74 |

Based on the results of measurement of the temperatures of radiating unit 13 shown in Table 6, the temperature difference considered to be formed between the surfaces of thermoelectric conversion element 3 was calculated and derived in consideration of output characteristics of thermoelectric conversion element 3. The results are shown in Table 7.

TABLE 7

Temperature Difference [° C.] Considered to be Formed in Thermoelectric Conversion Element

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 2 | | | 7 | 8 | 7 |
| | 50 | 4 | | | 12 | 13 | 12 |
| | 60 | 6 | | | 17 | 18 | 17 |
| | 100 | 13 | | | 38 | 41 | 37 |
| | 150 | 22 | | | 66 | 70 | 62 |
| | 200 | 32 | | | 93 | 100 | 87 |
| | 300 | 51 | | | 148 | 159 | 139 |

Example 3-3

In the sample employing the thermoelectric conversion element having a thermal conductivity of 1 W/mK and employing the copper rod as heat transfer unit 40, Table 8 shows results of measuring temperatures of radiating unit 13 caused due to respective combinations of setting conditions for heat source temperature and conditions for the length of heat transfer unit 40.

TABLE 8

Temperature [° C.] of Radiating Unit

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 36 | 35 | 32 | 29 | 27 | 26 |
| | 50 | 44 | 41 | 35 | 30 | 28 | 27 |
| | 60 | 52 | 46 | 40 | 33 | 29 | 28 |
| | 100 | 81 | 71 | 56 | 41 | 33 | 29 |

Based on the results of measurement of the temperatures of radiating unit 13 shown in Table 8, the temperature difference considered to be formed between the surfaces of thermoelectric conversion element 3 was calculated and derived in consideration of output characteristics of thermoelectric conversion element 3. The results are shown in Table 9.

TABLE 9

Temperature Difference [° C.] Considered to be Formed in Thermoelectric Conversion Element

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 4 | 5 | 8 | 11 | 12 | 12 |
| | 50 | 7 | 9 | 15 | 19 | 21 | 21 |
| | 60 | 8 | 14 | 20 | 26 | 29 | 29 |
| | 100 | 19 | 29 | 43 | 56 | 62 | 62 |

Example 3-4

In the sample employing the thermoelectric conversion element having a thermal conductivity of 1 W/mK and employing the heat pipe as heat transfer unit 40, Table 10 shows results of measuring temperatures of radiating unit 13 caused due to respective combinations of setting conditions for heat source temperature and conditions for the length of heat transfer unit 40.

TABLE 10

Temperature [° C.] of Radiating Unit

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 36 | | | | 27 | 26 |
| | 50 | 44 | | | | 28 | 27 |
| | 60 | 52 | | | | 29 | 27 |
| | 100 | 81 | | | | 33 | 29 |

Based on the results of measurement of the temperatures of radiating unit 13 shown in Table 10, the temperature difference considered to be formed between the surfaces of thermoelectric conversion element 3 was calculated and derived in consideration of output characteristics of thermoelectric conversion element 3. The results are shown in Table 11.

TABLE 11

Temperature Difference [° C.] Considered to be Formed in Thermoelectric Conversion Element

| | | Length [mm] of Second Heat Transfer Unit | | | | | |
|---|---|---|---|---|---|---|---|
| | | 0 | 20 | 50 | 100 | 150 | 300 |
| Heat Source Temperature [° C.] | 40 | 4 | | | | 13 | 13 |
| | 50 | 7 | | | | 22 | 22 |
| | 60 | 8 | | | | 30 | 31 |
| | 100 | 19 | | | | 65 | 67 |

The configuration of the comparative example shown in FIG. 4 corresponds to the configuration of the sample shown in FIG. 7 in which the length of the heat transfer unit is set at 0. Therefore, in each of Tables 4 to 11, the column indicating that the "Length of Second Heat Transfer Unit" is 0 mm corresponds to the comparative example. As shown in Tables 5, 7, 9, and 11, in each of the cases of Example 3-1 to Example 3-4, a larger temperature difference than that in the comparative example was obtained by increasing the length of heat transfer unit 40. Considering Example 3-1 to Example 3-4 as a whole, it is understood that there was obtained a temperature difference 1.25 times to 4.0 times as large as that of the comparative example. Generally, the amount of generated electric power of the thermoelectric conversion element is proportional to the square of the temperature difference, so that the amount of generated electric power 1.5 times to 16 times as large as that of the comparative example is obtained by increasing the length of heat transfer unit 40.

A larger effect is obtained when using a thermoelectric conversion element having a lower thermal conductivity. A larger effect is obtained when using a heat transfer unit having a high thermal conductivity. By increasing the length of the heat transfer unit, it is possible to suppress the temperature of the radiating unit from being increased due to radiant heat from the heat source or the like. However, when the heat transfer unit is too long, the heat is lost in the heat transfer unit, with the result that the temperature difference obtained in the thermoelectric conversion element may be decreased. As the heat transfer unit becomes longer, a problem arises in mechanical strength of the heat transfer unit. Therefore, a heat transfer unit which is too long is undesirable, and an optimal length exists therefor. The condition of the optimal length is dependent on the environment in which the heat transfer unit is used. However, a length of not less than 50 mm and less than 300 mm is considered to be optimal, and attains a temperature difference at least twice that of the comparative example (in the case of a length of 0 mm). Moreover, when the temperature of the radiating unit is low, an electronic circuit can also be provided at the radiating unit.

It should be noted that the above-described embodiments and examples disclosed herein are illustrative and are not limiting in any respect. The scope of the present invention is defined by the terms of the claims, rather than the embodiments described above, and is intended to include any modifications within the scope and meaning equivalent to the terms of the claims.

The invention claimed is:

1. A temperature detecting device comprising:
a temperature detector having a temperature receiving element that detects a temperature of a heat source;
a power generation unit including a thermoelectric conversion element, the power generator unit being spaced from the detecting unit;
a first heat transfer unit that transfers heat or cold of the heat source to the power generation unit;
a radiator spaced from the power generation unit for radiating heat or cold to a position outside of the temperature detecting device;
a second heat transfer unit that receives heat or cold from the power generation unit and transfers the heat or cold to the radiator;
an output unit coupled to the temperature detector and transmitting or providing information about the temperature detected by the temperature detector; and
the thermoelectric conversion element generating electric power by way of a temperature difference between a surface of the thermoelectric conversion element facing the first heat transfer unit and a surface of the thermoelectric conversion element facing the second heat transfer unit, the thermoelectric conversion element supplying electric power required to operate the temperature receiving element and the output unit.

2. The temperature detecting device according to claim 1, wherein the first heat transfer unit is a heat pipe or a metal rod.

3. The temperature detecting device according to claim 1, wherein the first heat transfer unit has an outer circumferential surface surrounded by a heat insulating material or a heat insulating space.

4. The temperature detecting device according to claim 3, wherein the second heat transfer unit is a heat pipe or a metal rod.

5. The temperature detecting device according to claim 1, wherein the second heat transfer unit has an outer circumferential surface surrounded by a heat insulating material or a heat insulating space.

6. The temperature detecting device according to claim 1, wherein the output unit includes a wireless signal transmitter that wirelessly transmits a signal indicative of the temperature detected by the temperature detector.

7. The temperature detecting device according to claim 1, wherein the output unit is spaced from the radiator when viewed from the heat source.

8. The temperature detecting device according to claim 1, wherein the radiator includes a fan for facilitating radiation of the heat or cold and the thermoelectric conversion element supplies electric power required to operate the fan.

9. The temperature detecting device according to claim 1, wherein the heat source is a cold source having a temperature lower than an ambient temperature, and the thermoelectric conversion element generates electric power by way of a temperature difference formed between the surface of the thermoelectric conversion element facing the first heat transfer unit and the surface of the thermoelectric conversion element facing the second heat transfer unit, the temperature difference being formed by radiating thermal energy in the radiator.

10. The temperature detecting device according to claim 1, further comprising a case in which at least the first heat transfer unit is stored.

11. The temperature detecting device according to claim 1, wherein the first heat transfer unit has a length of between 50 mm and 299 mm.

12. The temperature detecting device according to claim 11, wherein the second heat transfer unit has a length of between 50 mm and 299 mm.

13. The temperature detecting device according to claim 1, wherein the second heat transfer unit has a length of between 50 mm and 299 mm.

14. The temperature detecting device according to claim 1, wherein the output unit comprises a wireless transmitter.

* * * * *